United States Patent [19]
Ferrada Suarez

[11] Patent Number: 5,873,007
[45] Date of Patent: Feb. 16, 1999

[54] PICTURE COMPOSITION GUIDANCE SYSTEM

[75] Inventor: Luis Arnaldo Ferrada Suarez, Santiago, Chile

[73] Assignees: Sony Corporation, Japan; Sony Electronics, Inc., Park Ridge, N.J.

[21] Appl. No.: 958,976

[22] Filed: Oct. 28, 1997

[51] Int. Cl.⁶ .......................... G03B 13/02; G03B 17/20
[52] U.S. Cl. .......................... 396/296; 396/374; 348/334
[58] Field of Search .................... 396/147, 296, 396/373, 378, 374; 348/333, 334

[56] References Cited

U.S. PATENT DOCUMENTS

| | | | |
|---|---|---|---|
| 1,140,108 | 5/1915 | Brown | 396/373 |
| 5,687,408 | 11/1997 | Park | 396/296 X |

Primary Examiner—William Perkey
Attorney, Agent, or Firm—Ronald P. Kananen

[57] ABSTRACT

A picture composition guidance system for guiding a user to take pictures with quality picture compositions includes a horizon guide having an upper horizontal line and a lower horizontal line, a diagonal guide having a pair of diagonal lines, and a strong points guide having a pair of upper markers, a pair of lower markers, and a center marker. The horizon guide, the diagonal guide, and the strong points guide are superimposed on a viewfinder for a camera such that the upper horizontal line and the lower horizontal line demarcate the view finder substantially in thirds. Further, the pair of diagonal lines intersect on the lower horizontal line while the pair of upper markers are positioned on the upper horizontal line, the pair of lower markers are positioned on the lower horizontal line, and the center marker is positioned substantially in the center of the viewfinder. One embodiment of the invention further includes a toggle feature allowing a user to customize which one of the guides are displayed on the viewfinder.

15 Claims, 4 Drawing Sheets

PICTURE COMPOSITION GUIDANCE SYSTEM

FIELD OF THE INVENTION

The present invention relates to picture compositions of recorded pictures. In particular, the present invention is directed to a guide for picture composition in recording pictures using a camera, such as a video camera, for example.

BACKGROUND OF THE INVENTION

Cameras of all types are becoming more and more affordable to consumers as technologies for manufacturing cameras have become more efficient and cost effective. Consequently, many consumers are purchasing and using cameras to take photographic pictures, video recordings, and even digitized pictures. Many amateur photographers or videographers make mistakes when taking pictures or making video recordings which can only be avoided by taking photography or videography courses. One such area of common mistake is in the area of picture composition.

Because people have an affinity for symmetry, amateur photographers or videographers tend to align a subject in the center of a picture or video recording at all times, creating bland or sometimes disastrous picture composition. These amateurish mistakes are further reinforced by cameras currently in use. As shown in FIG. 1, viewfinders of most cameras only have a circle or a cross-hair in the center of a viewfinder with maybe brackets on the outer edges to delimit the size of pictures or screens on which the picture would be transferred. Almost instinctively, users align the subject of the picture to the circle or cross-hair in the center of the viewfinder. Even those users who are taking or have taken picture composition courses sometimes do not understand the concept of horizons, diagonals, and strong points, for example, or forget the lessons learned from lack of frequently practice. What is needed is a user-friendly guidance system that would aid a camera user in taking pictures with quality picture compositions.

SUMMARY OF THE INVENTION

The present invention is directed to a picture composition guidance system for camera users in taking pictures. In particular, the picture composition guidance system of the present invention comprises a horizon guide including an upper horizontal line and a lower horizontal line, a diagonal guide including a pair of diagonal lines, and a strong points guide including a pair of upper markers, a pair of lower markers, and a center marker. The horizon guide, the diagonal guide, and the strong points guide are superimposed on the view finder such that the upper horizontal line and the lower horizontal line of the horizon guide demarcate the view finder substantially in thirds. Further, the pair of diagonal lines of the diagonal guide intersect on the lower horizontal line. Still further, the pair of upper markers are positioned on the upper horizontal line, the pair of lower markers are positioned on the lower horizontal line, and the center marker is positioned substantially in the center of the viewfinder.

In one embodiment of the invention, the picture composition guidance system of the present invention includes a toggle feature that allows the user to toggle the guidance system on and off, effectively displaying the guidance system on the viewfinder when need and hiding the guidance system when not needed. Further, the toggle feature of the present invention allows a user to choose which guides should be displayed on the viewfinder at any given time therefore customizing the viewfinder to display only those guides needed by the user.

One advantage of the guidance system of the present invention is that the present invention allows even the novice of camera users to create pictures, whether photographic or video, with quality picture compositions otherwise reserved only for those highly trained in photography or videography.

Another advantage of the guidance system of the present invention is that the present invention may function as reminders to even those who are trained in the photographic or videographic arts when taking pictures.

Yet another advantage of the guidance system of the present invention is that the present invention can be customized to display only the needed guides to those users who might be well versed in one aspect of picture composition while being weak on others.

Yet another advantage of the guidance system of the present invention is that the guides may be incorporated into any camera system whether the camera is photographic, video, or digital.

BRIEF DESCRIPTION OF DRAWINGS

The features and inventive aspects of the present invention will become more apparent upon reading the following detailed description, claims, and drawings, of which the following is a brief description:

DETAILED DESCRIPTION OF THE INVENTION

Figure 1:
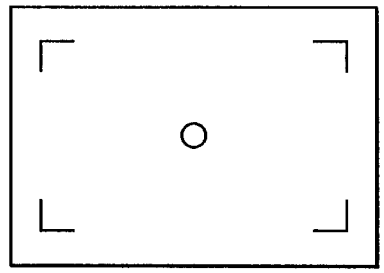
FIG. 1 is a view of a viewfinder of the prior art.
Figure 2:
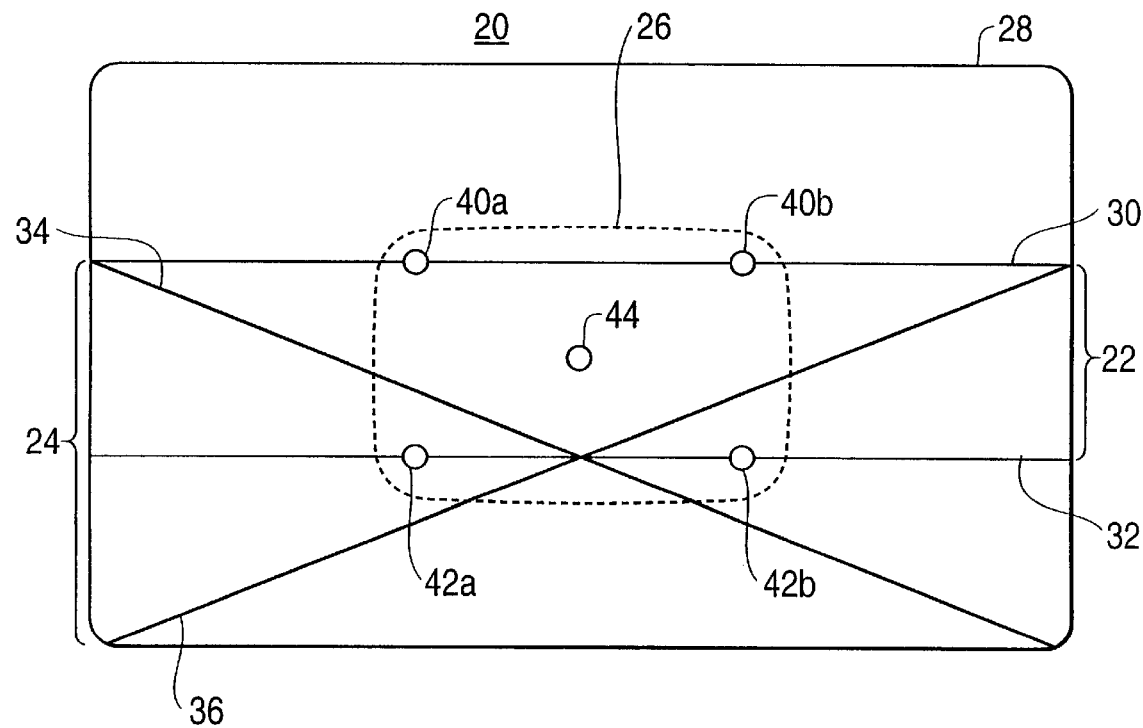
FIG. 2 is a plan view of a picture composition guidance system of the present invention.

FIG. 2 shows a plan view of one embodiment of the present invention. Picture composition guidance system 20 of the present invention includes a horizon guide 22, a diagonal guide 24, and a strong points guide 26. Each of these guides are superimposed on viewfinder 28 of a photographic camera, a video camera, or the like.

Horizon guide 22 includes an upper horizontal line 30 and a lower horizontal line 32. Lower horizontal line 32 is placed approximately one-third of the way above the bottom of viewfinder 28. Further, upper horizontal line 30 is placed approximately two-thirds of the way above the bottom of viewfinder 28. In this way, viewfinder 28 is divided into thirds by upper horizontal line 30 and lower horizontal line 32. The placement of upper and lower horizontal lines 30 and 32 are critical because horizon guide 22 follows the "rule of thirds" as taught in graphic design and photography. The "rule of thirds" is based on the theory that the human eye naturally looks to a point about two-thirds up a page. In this way, horizon guide 22 aids the user to place horizons of the subject in the appropriate areas of the picture. For example, a user would place the horizon near or on upper horizontal line 30 to emphasize land or water whereas the horizon would be placed near or on lower horizontal line 32 to emphasize the sky.

Diagonal guide 24 includes diagonal lines 34 and 36 intersecting at approximately one third of the way above the bottom of viewfinder 28. As usually taught in photography courses, diagonal placement of linear shaped subjects, such as roads, waterways, and fences, for example, are generally perceived to be more dynamic than horizontal placement. Diagonal guide 24 aids a user in placing linear subjects in diagonal perspectives while preventing too much rotation of the subject.

Strong points guide 26 includes a pair of upper markers 40a and 40b, a pair of lower markers 42a and 42b, and center marker 44. Upper markers 40a and 40b are positioned approximately two-thirds of the way above the bottom of viewfinder 28 and are spaced apart approximately a third of the way longitudinally of viewfinder 28, thus dividing upper horizontal line 30 approximately in thirds. Similarly, lower markers 42a and 42b are positioned one-third of the way above the bottom of viewfinder 28 and spaced apart approximately a third of the way longitudinally of viewfinder 28, thus dividing lower horizontal line 32 approximately in thirds. Center marker 44 is positioned approximately in the center of viewfinder 28. The purpose of strong points guide 26 is to aid the user in placement of subjects in the picture.

Generally, asymmetric (informal) balance is considered to be more pleasing in a picture than symmetric (formal) balance in photography. Placing the main subject off-center and balancing the offset with another minor object, for example, is usually more effective than merely placing the subject in the center of a picture. Furthermore, giving a moving subject room in the picture projects a sense of dynamic motion. Strong points guide 26 guides a user to place a subject or multiple subjects on or near any of markers 40a–44 based on the principles above.

Figure 3:
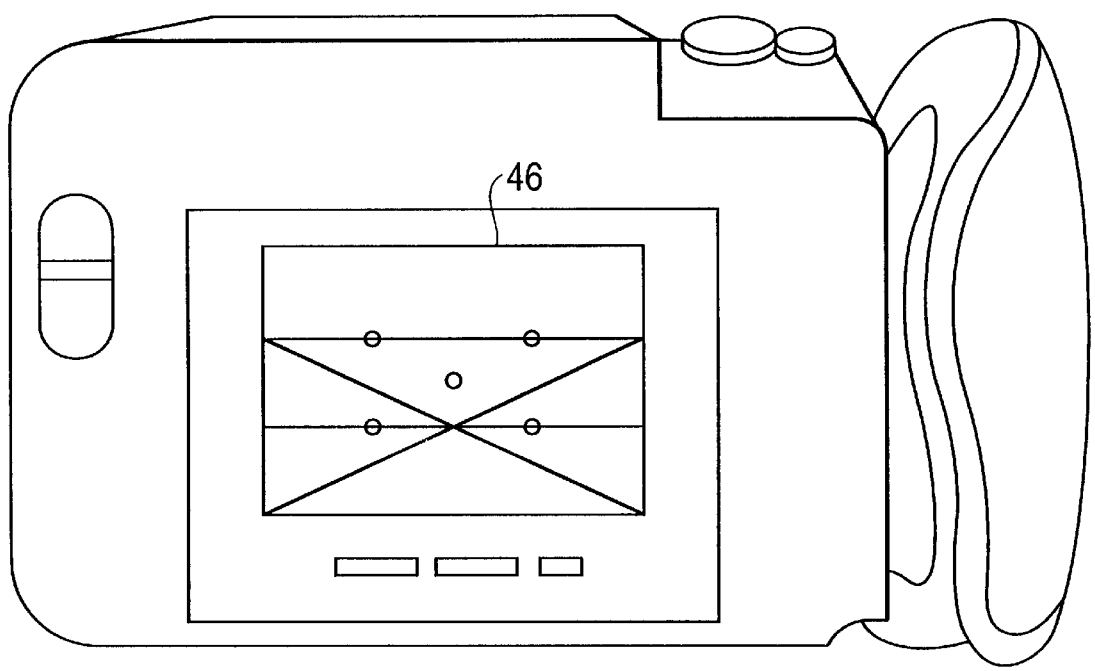
FIG. 3 is an example of a video recorder employing the picture composition guidance system of the present invention.
Figure 4:
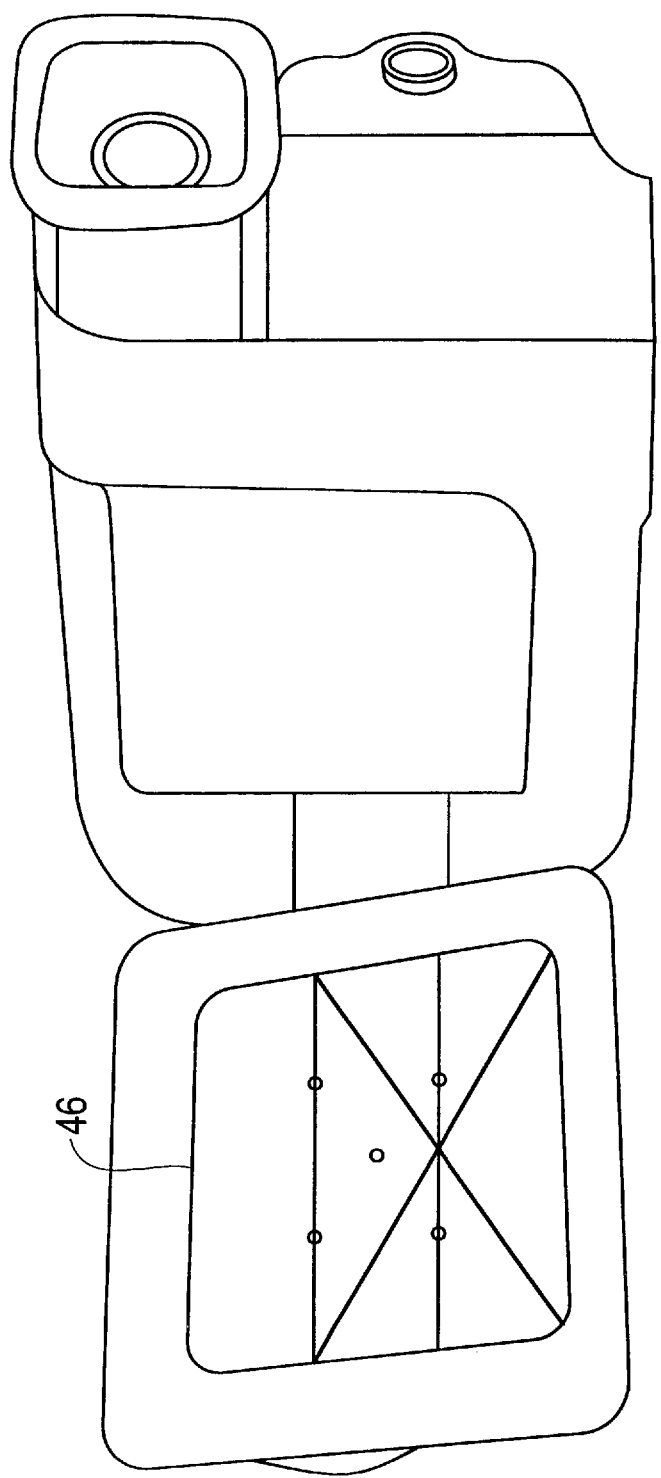
FIG. 4 is an example of another video recorder employing the picture composition guidance system of the present invention.

Viewfinder 28 may be, but not limited to, those of photographic cameras, video cameras, digital cameras, and the like. Guides 22, 24, and 26 may be etched into viewfinder 28 similar to most common cameras, but other suitable methods may be used. Particularly most video cameras utilize liquid crystal displays ("LCD") as viewfinders. As shown in FIG. 3, some models employ large LCD screens that are built into the back casing. On others, as shown in FIG. 4, a pivoting LCD screen is employed to view the picture being recorded.

Figure 5:
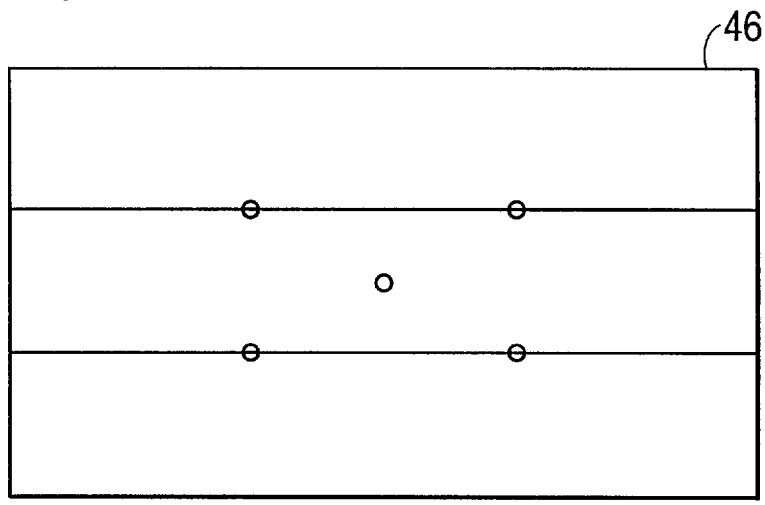
FIGS. 5 and 6 are an example of customization feature of the present invention.
Figure 6:
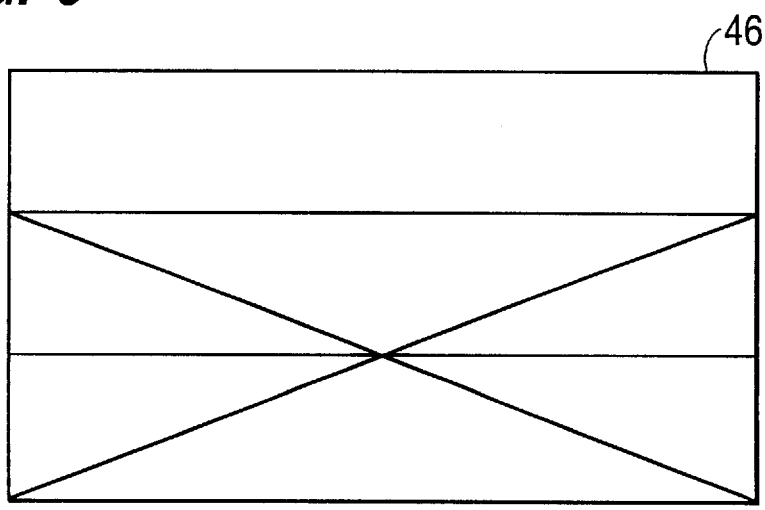

According to another embodiment of the present invention, a toggling feature allows a user to superimpose picture composition guide 20 on LCD viewfinder 46. In particular, the toggling feature allows a user to turn picture composition guide 20 on and off such that picture composition guide 20 appears on LCD screen 46 when invoked by the user and disappears when disabled. Furthermore, the toggling feature allows a user to customize which of guides 22, 24, and 26 are displayed at any given time. For example, a user might only need horizon guide 22 and strong points guide 26 for one picture as shown in FIG. 5, but needs horizon guide 22 and diagonal guide 24 for anther picture as shown in FIG. 6. In this way, a user can customize which guides are displayed on the viewfinder using the toggling feature to meet different needs.

Having fully described the preferred embodiments of the invention, variations and modifications may be employed without departing from the scope of the present invention. Accordingly, the following claims should be studied to learn the true scope of the present invention.

What is claimed is:

1. A picture composition guidance system usable with a viewfinder of a camera comprising:

a horizon guide including an upper horizontal line and a lower horizontal line, wherein said horizon guide is superimposed on said view finder such that said upper horizontal line and said lower horizontal line demarcate said view finder substantially in equal thirds; and a diagonal guide including a pair of intersecting diagonal lines, wherein said diagonal guide is superimposed on said viewfinder such that said pair of diagonal lines extend along substantially the longitudinal length of said view finder and intersect on said lower horizontal line at substantially the middle of the longitudinal direction of said lower horizontal line.

2. A picture composition guidance system usable with a viewfinder of a camera comprising:

a diagonal guide including a pair of intersecting diagonal lines, wherein said diagonal guide is superimposed on said viewfinder such that said pair of diagonal lines extend along substantially the longitudinal length of said view finder and said pair of diagonal lines intersect at approximately one third of the way above the bottom of said viewfinder and at substantially the middle of the longitudinal direction of said view finder.

3. A picture composition guidance system usable with a viewfinder of a camera comprising:

a horizon guide including an upper horizontal line and a lower horizontal line;

a diagonal guide including a pair of diagonal lines extending substantially the longitudinal length of said view finder; and a strong points guide including a pair of upper markers, a pair of lower markers, and a center marker, wherein said horizon guide, said diagonal guide, and said strong points guide are superimposed on said view finder such that said upper horizontal line and said lower horizontal line demarcate said viewfinder substantially in equal thirds, said pair of diagonal lines intersect on said lower horizontal line at substantially the middle of the longitudinal length of said lower horizontal line, said pair of upper markers are positioned on said upper horizontal line, said pair of lower markers are positioned on said lower horizontal line, and said center marker is positioned substantially in the center of said viewfinder.

4. The guidance system of claim 3, further comprising a toggle feature for toggling each of said horizontal lines, said diagonal lines, and said markers of said horizon guide, said diagonal guide, and said strong points guide on and off in any combination.

5. The guidance system of claim 3, wherein said viewfinder is a liquid crystal display.

6. The guidance system of claim 3, wherein said camera is a photographic camera.

7. The guidance system of claim 3, wherein said camera is a video camera.

8. The guidance system of claim 3, wherein said camera is a digital camera.

9. The picture composition guidance system as set forth in claim 2, further comprising:

a strong points guide for guiding the balance of a picture composition including a pair of upper markers, a pair of lower markers, and a center marker, wherein said upper, lower, and center markers are superimposed on said view finder.

10. The picture composition guidance system as set forth in claim 9, wherein said pair of upper markers are positioned on said upper horizontal line, said pair of lower markers are positioned on said lower horizontal line, and said center marker is positioned substantially in the center of said viewfinder.

11. The guidance system of claim 9, further comprising a toggle feature for toggling each of said diagonal lines and said markers of said diagonal guide and said strong points guide on and off in any combination.

12. The guidance system of claim 2, further comprising a toggle feature for toggling each of said diagonal lines of said diagonal guide on and off in any combination.

13. The guidance system of claim 1, further comprising a toggle feature for toggling each of said horizontal lines and said diagonal lines of said horizon guide and said diagonal guide on and off in any combination.

14. A picture composition guidance system usable with a viewfinder of a camera comprising:

a diagonal guide including a pair of intersecting diagonal lines, wherein said diagonal guide is superimposed on said viewfinder such that said pair of diagonal lines extend along substantially the longitudinal length of said view finder and intersect at substantially one third of the way above the bottom of said view finder; and a toggle feature for toggling each of said diagonal lines of said diagonal guide on and off in any combination.

15. A picture composition guidance system usable with a viewfinder of a camera comprising:

a horizon guide including an upper horizontal line and a lower horizontal line;

a diagonal guide including a pair of diagonal lines; and a strong points guide including a pair of upper markers, a pair of lower markers, and a center marker, wherein said horizon guide, said diagonal guide, and said strong points guide are superimposed on said view finder such that said upper horizontal line and said lower horizontal line demarcate said viewfinder substantially in equal thirds, said pair of diagonal lines intersect on said lower horizontal line, said pair of upper markers are positioned on said upper horizontal line, said pair of lower markers are positioned on said lower horizontal line, and said center marker is positioned substantially in the center of said viewfinder, said guidance system further including a toggle feature for toggling each of said horizontal lines, said diagonal lines, and said markers of said horizon guide, said diagonal guide, and said strong points guide on and off in any combination.

* * * * *